United States Patent

[11] 3,611,894

[72] Inventor: Viktor Minneste, Jr.
Chicago, Ill.
[21] Appl. No.: 818,313
[22] Filed: Apr. 22, 1969
[45] Patented: Oct. 12, 1971
[73] Assignee: Bell & Howell Company
Chicago, Ill.

[54] AUTOMATIC EXPOSURE CONTROL SYSTEM
9 Claims, 1 Drawing Fig.

[52] U.S. Cl. .................................. 95/10 C,
95/10 C, 95/64 D
[51] Int. Cl. .................................. G03b 7/10
[50] Field of Search .................................. 95/10 C, 64
D; 352/141; 250/210

[56] References Cited
UNITED STATES PATENTS

| | | | |
|---|---|---|---|
| 3,455,227 | 7/1969 | Sato et al. | 95/10 C X |
| 3,442,190 | 5/1969 | Erickson | 95/10 C |
| 3,426,662 | 2/1969 | Sevin | 95/10 C |
| 3,340,785 | 9/1967 | Adler et al. | 95/10 C |
| 3,430,053 | 2/1969 | Westhaver | 95/10 C X |
| 3,455,219 | 7/1969 | Burgarella | 95/10 C |

Primary Examiner—Samuel S. Matthews
Assistant Examiner—Russell E. Adams, Jr.
Attorneys—Griffin, Branigan & Kindness and William F. Pinsak ABSTRACT: This disclosure describes an automatic exposure control system for controlling the iris of a camera. Power is applied through a stabilizing voltage string and voltage dividers, as well as from unregulated batteries through collector resistors, to preamplifiers. A photocell circuit that senses the amount of light passing through the iris is connected to the inputs of the preamplifiers. Signal shapers are connected to the preamplifiers to provide fast exposure correction without overshoot. The outputs from the preamplifiers are connected through stabilizer amplifiers and power amplifiers to a motor which controls the opening and closing of the iris. The stabilizer amplifiers may also be connected through a feedback circuit to the photocell circuit so that sustained oscillations are created and either a balanced or an unbalanced duty cycle waveform is imposed upon the reversible DC motor. When the duty cycle waveform is balanced, the motor has moved the iris to its correct balance position. When the waveform is unbalanced, the motor shaft rotates and moves the connected iris in the appropriate direction.

PATENTED OCT 12 1971
3,611,894
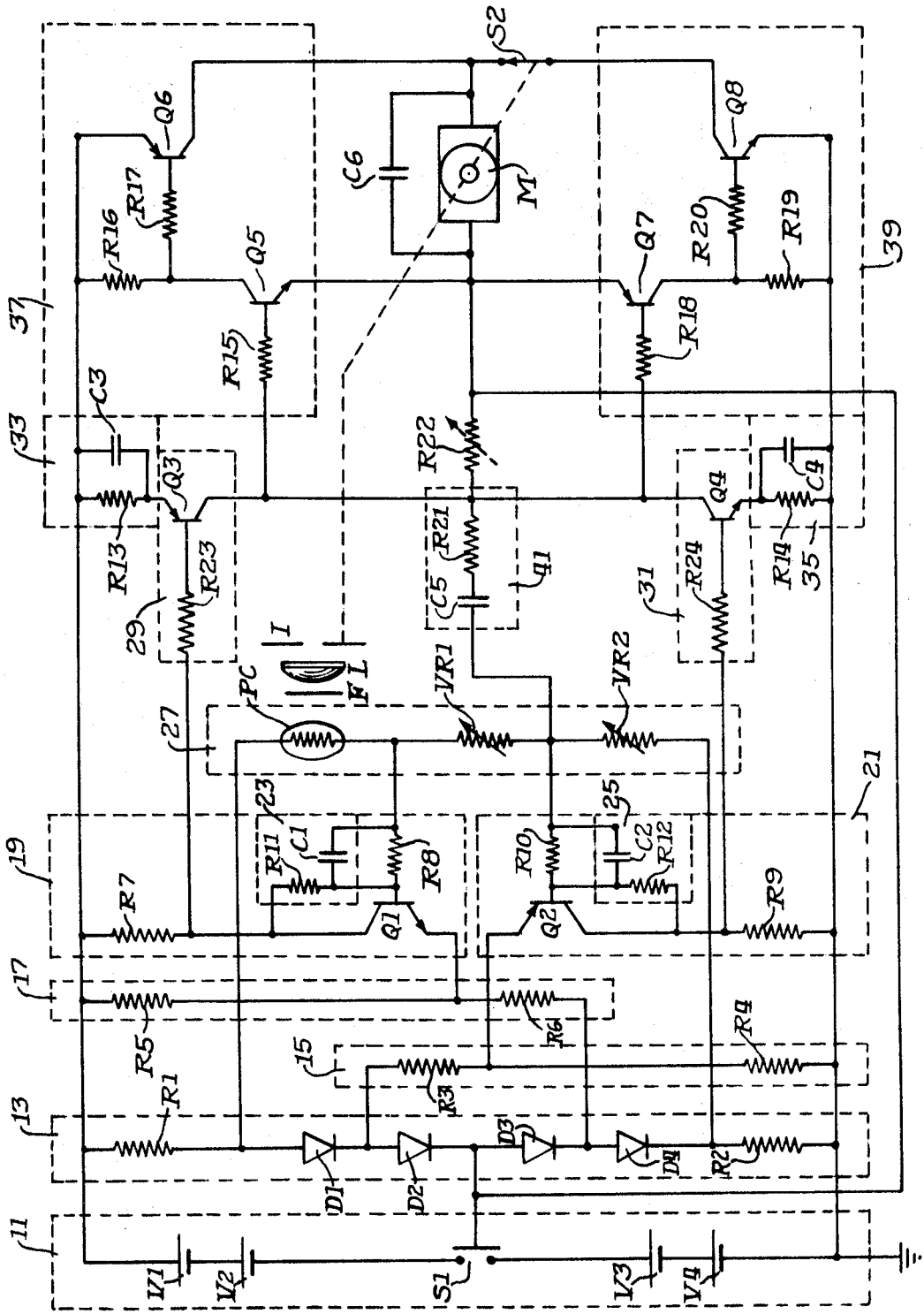
Inventor:
Viktor Minneste, Jr.
By Griffin, Branigan and Kindness
Atty

AUTOMATIC EXPOSURE CONTROL SYSTEM

BACKGROUND OF THE INVENTION

The prior art has proposed various systems for controlling the exposure of a camera or other optical systems. Generally, these systems include a photosensitive means, such as a photocell or a photoresistor, to sense the amount of light either in the scene being photographed or observed, or the light passing through the lens, or the lens-iris combination, of the camera. The output from the photocell or photoresistor is utilized to control the opening and closing of the iris of the camera so that the desired iris opening is achieved for a particular light condition. While these systems have found widespread use in "still" cameras, they have been less satisfactory in other cameras, such as motion picture cameras, for example.

The prior art automatic exposure control systems have various problems. Some of these systems have flicker because they tend to hunt for the appropriate iris setting. Others are slow reacting, particularly those systems which utilize a photoresistive cell to monitor low-light levels passing the camera's lens at high-sensitivity film speed settings, at which levels suitable photoresistive cells tend to have long reaction time constants. Noticeable flicker in exposed footage due to hunting is an irritating exposure system defect. In the case of slow system reaction, several motion picture frames are usually over- or underexposed before the appropriate iris setting is obtained when fast changes in light conditions occur in the scene being photographed. In addition, many prior art systems are expensive because they use expensive components. For example, one prior art system utilizes a two-winding motor to control the movement of the iris. However, a single winding motor is less expensive, therefore the overall system cost can be reduced if a single winding motor is used. Moreover, a single winding motor is usually smaller than a two-winding motor, hence, a single winding motor system is more compact than a two-winding motor system.

Therefore, it is an object of this invention to provide a new and improved apparatus for controlling the exposure of a camera or other optical system.

It is a further object of this invention to provide a new and improved automatic exposure control system suitable for use with a motion picture camera.

It is yet another object of this invention to provide a new and improved automatic exposure control system that is fast reacting despite the slow reaction characteristics of a suitable and typical photocell—such as a Cadmium Sulfide photocell—at low-monitored light levels, is inexpensive to manufacture, eliminates flicker and is suitable for use with a motion picture camera from a size and power consumption viewpoint.

Another problem that exists with many prior art systems is that as the voltage supply of the photoresistor (if a photoresistor is the sensing device) drops due to the discharge of the battery used in the system, error between the setting of the iris and the light sensed by the photocell creeps into the system.

Therefore, it is yet another object of this invention to provide an automatic exposure control system that is relatively unaffected by battery voltage drop.

SUMMARY OF THE INVENTION

In accordance with a principle of this invention, a new and improved automatic exposure control system suitable for use with a motion picture camera or other optical system is provided. A stabilized bias voltage is applied to preamplifier circuits which include a stabilized-voltage-operated light sensing means adapted to sense the amount of light passing through the iris of the camera in a so-called optical null system. The preamplifier circuits are connected in oscillating or nonoscillating amplifier loops which may include an electrical feedback means. A single winding motor controlling the opening of the iris is common to both loops. If the oscillations in both loops are equal, or if the light sensor output voltage is below the limits which would cause a turn-on current to pass through the motor winding, the iris is set at the desired opening. If the oscillations are unequal, or the light sensor output voltage exceeds the limits which would cause a turn-on current to pass through the motor winding, the motor is energized to move the iris aperture to the desired setting.

In accordance with a further principle of this invention, signal shaper means are connected to the preamplifier means to provide rapid response and prevent overshoot.

In accordance with yet another principle of this invention, a stabilized voltage is applied to the light sensing means and the preamplifier means through a diode string and voltage dividers.

In accordance with a still further principle of this invention the amplifier loops are stabilized to provide an overall system which is stable and flicker free within deadband limits or following disturbances caused by relatively small light changes.

It will be appreciated from the foregoing description that the invention provides a closed-loop automatic exposure control system suitable for use with a motion picture camera. However, the system is not limited to use with a motion picture camera, rather it can be utilized with still cameras or other optical systems where it is desired to control the opening of an iris aperture in a rapid, stable, and accurate manner.

It will also be appreciated that the invention is relatively uncomplicated for the desirable characteristics it provides, merely requiring a stabilized voltage source connected to photocell circuitry and preamplifiers. The preamplifiers are connected to photosensing means which sense the light passing through the iris. In addition to nonoscillatory connections, the preamplifiers may also be connected in oscillating loop circuits through power amplifiers to a single winding motor. The motor is, in turn, connected to control the opening of the iris aperture. If the oscillations of the loops are balanced, or if the photocell resistance value is at or near the perfect balance value, the motor is either equally energized in both directions or not energized at all and, hence, the iris opening is not altered. If the oscillations are unbalanced, or if the photocell resistance value deviates markedly from the perfect balance value, the motor is either unequally energized, favoring one direction, or steadily energized in one direction and the iris opening changes to the desired value. Signal shaping and stabilizing circuits provide quick response without overshoot with a slow-acting light sensor.

BRIEF DESCRIPTION OF THE DRAWING

The foregoing objects and many of the attendant advantages of this invention will become more readily appreciated as the same becomes better understood by reference to the following detailed description when taken in conjunction with the accompanying drawing wherein an electrical schematic diagram of a preferred embodiment of the invention is illustrated.

DESCRIPTION OF THE PREFERRED EMBODIMENT

The FIGURE illustrates a preferred embodiment of the invention and comprises: a power supply 11; a diode string 13; first and second voltage dividers 15 and 17; first and second preamplifiers 19 and 21; first and second signal shaping networks 23 and 25; a photocell circuit 27; first and second amplifiers 29 and 31; first and second stabilizing circuits 33 and 35; first and second power amplifiers 37 and 39; and, feedback circuit 41.

The power supply 11 comprises: four cells designated V1, V2, V3, and V4; and, a switch designated S1. V1 through V4 may be 1.5 volt standard AA batteries or 1.2 volt rechargeable batteries, for example. S1 is a three-pole switch having a common terminal or contact that contacts two separate terminals when closed in the manner illustrated, or in any alternate manner which assures proper power application with least system disturbance and complete power removal from all circuit components when not actuated. V1 is connected in series with V2 with the negative terminal of V2 connected to one of the separate terminals of S1. V3 is connected in series with V4 with the positive terminal of V3 connected to the other separate terminal of S1. The negative terminal of V4 may be connected to ground, as shown.

The diode string 13 comprises: two resistors designated R1 and R2; and four silicon diodes designated D1, D2, D3, and D4. One end of R1 is connected to the positive terminal of V1. The other end of R1 is connected to the anode of D1. The cathode of D1 is connected to the anode of D2. The cathode of D2 is connected to the common terminal of S1 and to the anode of D3. The cathode of D3 is connected to the anode of D4 and the cathode of D4 is connected through R2 to the negative terminal of V4.

The first voltage divider 15 comprises two resistors designated R3 and R4. One end of R3 is connected to the junction between D1 and D2. The other end of R3 is connected through R4 to the negative terminal of V4. The second voltage divider 17 comprises two resistors designated R5 and R6. R5 and R6 are connected in series from the positive terminal of V1 to the junction between D3 and D4.

The first preamplifier 19 comprises: an NPN transistor designated Q1; and two resistors designated R7 and R8. The emitter of Q1 is connected to the junction of R5 and R6 and the collector of Q1 is connected to one end of R8. The second preamplifier 21 comprises: a PNP transistor designated Q2; and, two resistors designated R9 and R10. The emitter of Q2 is connected to the junction between R3 and R4 and the collector of Q2 is connected through R9 to the negative terminal of V4. The base of Q2 is connected to one end of R10.

The first signal shaping network 23 comprises: a resistor designated R11; and, a capacitor designated C1. It should be noted that R8 and the input impedance of Q1 also contribute to this signal shaping function. R11 is connected between the base and the collector of Q1. C1 is connected in parallel with R8. The second signal shaping network 25 comprises: a resistor designated R12; and, a capacitor designated C2. Again, it should be noted that R10 and the input impedance of Q2 also contribute to the signal shaping function. R12 is connected between the base and the collector of Q2 and C2 is connected in parallel with R10.

The photocell circuit 27 comprises: a photocell (or photoresistor) designated PC; and, two variable resistors designated VR1 and VR2. PC, VR1 and VR2 are connected in series in that order between the junction of R1 and D1 and the junction of R2 and D4. The junction between PC and VR1 is connected to the other end of R8. The junction between VR1 and VR2 is connected to the other end of R10.

The first amplifier 29 comprises: a PNP transistor designated Q3: and, a resistor designated R23. In addition a resistor designated R22, which may be either fixed or variable, forms part of the collector load of Q3 in common with Q4. The base of Q3 is connected to the collector of Q1 through R23. One end of R22 is connected to the collector of Q3. The second amplifier 31 comprises: an NPN transistor designated Q4; and, a resistor designated R24. The base of Q4 is connected to the collector of Q2 through R24 and the same end of R22, that is connected to the collector of Q3 is connected to the collector of Q4.

The first stabilizing network 33 comprises: a resistor designated R13; and, a capacitor designated C3. R13 and C3 are connected in parallel between the emitter of Q3 and the positive terminal of V1. The second stabilizing network 35 comprises: a resistor designated R14; and, a capacitor designated C4. R14 and C4 are connected in parallel between the emitter of Q4 and the negative terminal of V4.

The first power amplifier 37 comprises: an NPN transistor designated Q5; a PNP transistor designated Q6; and, three resistors designated R15, R16 and R17. The base of Q5 is connected through R15 to the collectors of Q3 and Q4 and to the one end of their common collector resistor R22. The collector of Q5 is also connected through R16 to the positive terminal of V1. The collector of Q5 is also connected through R17 to the base of Q6. The emitter of Q5 is connected to the junction between D2 and D3 and to the other end of R22. The emitter of Q6 is connected to the positive terminal of V1.

The second power amplifier 39 comprises: a PNP transistor designated Q7; an NPN transistor designated Q8; and, three resistors designated R18, R19 and R20. The base of Q7 is connected through R18 to the collectors of Q3 and Q4 and to the one end of their common collector resistor R22. The collector of Q7 is also connected through R19 to the negative terminal of V4. The collector of Q7 is also connected through R20 to the base of Q8. The emitter of Q7 is connected to the junction between D2 and D3 and to the other end of R22. The emitter of Q8 is connected to the negative terminal of V4. The collector of Q8 is connected through a switch designated S2 to the collector of Q6.

The feedback circuit 41 comprises: a resistor designated R21: and, a capacitor designated C5. One end of R21 is connected to the collectors of Q3 and Q4 and the other end of R21 is connected through C5 to the junction between VR1 and VR2. For the nonoscillatory mode of system operation components R21 and C5 are not included.

Also illustrated in the FIGURE are: a light filter designated F; a lens designated L; and, an iris designated I. The iris is mechanically connected to the shaft of a motor (either directly or through a gearbox with a suitable reduction ratio) designated M, as indicated by a dotted line in the FIGURE As the motor shaft turns, the iris opens and closes in a manner well known in the art. The motor (or iris) is also mechanically connected to S2 for purposes hereinafter described. The motor M is preferably an unaltered single winding, reversible, commutator-type DC motor with small physical dimensions and low-power consumption. Also illustrated in the FIGURE is a capacitor designated C6 connected in parallel with the motor M. One side of the motor is connected to the junction between S2 and the collector of Q6. The other side of the motor is connected to the emitters of Q5 and Q7, which junction, in turn, is connected to the junction between D2 and D3 and the junction between V2 and V3, or center tap of the power supply, when the switch S1 is actuated.

Turning now to a description of the operation of the subsystems illustrated in the FIGURE, V1–V4 may, as stated above, be 1.5 volt alkaline AA cells or 1.2 volt rechargeable cells, for example. In either case, the "end-of-life" voltage of each cell is 1.0 volts. Hence usable unregulated power supply potential may vary between plus and minus 3 volts and plus and minus 2 volts with respect to the power supply center tap at S1 when S1 is actuated. With the circuit connections illustrated in the FIGURE, unregulated power is supplied to all stages of the automatic exposure control system of the invention except for the photocell circuit 27 and the emitters of Q1 and Q2 in order to make full use of the available voltage throughout the life of the batteries in the power supply.

The diode string 13 forms a regulated power supply for the photocell string. The regulated power supply will furnish 2.4 volts to the photocell circuit when silicon diodes are used. In general, the quality of regulation depends upon the characteristics of the diodes between the current limits which exist in the individual diodes and their current limiting resistors R1 and R2 as the individual batteries decay from their starting voltages to their "end-of-life" levels. Center tapping the diode string to the center tap of the power supply 11, as illustrated in the FIGURE, assures balanced operation.

In addition to providing a regulated voltage to the photocell circuit the diode string also biases the emitters of the preamplifiers transistors Q1 and Q2. The emitters of Q1 and Q2 are effectively connected across one diode each with respect to the center tap through low-value voltage divider resistors R3 and R6 so as to cause the base potentials of the transistors in question to remain essentially at zero with respect to the center tap of the power supply. That is, in one actual embodiment of the invention, the base-emitter drops of transistors Q1 and Q2 were 0.6 volts each and each corresponding single diode drop was also 0.6 volts, causing the base voltages of both conducting transistors to remain essentially at zero potential with respect to the center tap (except for the voltage drops across resistors R3 and R6). It will be appreciated by those skilled in the art that maintaining the two transistor base voltages at zero potential for a balanced system condition provides for a system of maximum balanced sensitivity.

Biasing of the preamplifier transistors Q1 and Q2 across the additional diode also aids in providing for a thermally stable system since changes in diode characteristics due to temperature changes compensate for similar changes in the base-emitter junctions of the transistors. More specifically, if the diodes are silicon diodes and Q1 and Q2 are silicon transistors, the temperature characteristics of the forward biased diodes and the operational base-emitter junctions of the transistors are similar, therefore, the effects tend to cancel.

Because of the fact that diode regulation is not perfect between the extreme diode biasing current levels as the individual battery voltages in the power supply decay during their usable life; and because transistor characteristics do change somewhat with changes in applied collector potential—as is the case for the unregulated stages of the system—the voltage dividers 15 and 17 apply the necessary final correction to the whole system by modifying the diode biasing voltages for the preamplifier transistors to the necessary degree. In one actual embodiment of the invention the applied biasing voltage correction to the preamplifier transistors Q1 and Q2 by the voltage dividers 15 and 17 was in the vicinity of 50 millivolts between the plus and minus 3 and plus and minus 2 volt power supply level extremes as discussed previously. The values of R3 and R6 were 500 ohms—low enough, so that the temperature stabilization characteristics of the biasing diodes were effectively retained, and high enough, so that the input impedances of Q1 and Q2 were kept near 50 kiloohms with transistor betas of 100 each. In this particular case the values of R4 and R5 were 10 kiloohms each.

The photocell PC is optically mounted behind the iris I, and the lens L (if required) and the filter F (if required) so that the resistance of the photocell can vary around an optimally selected value as the light passing through the iris aperture varies. VR1 is a deadband resistor and VR2 is a trimming resistor. With proper selection of circuit component characteristics and values VR1 can be eliminated so that the input voltage to the first and second preamplifiers 19 and 21 at the junction of the photocell and VR2 is identical due to the common junction. Application of regulated potential across the photocell circuit assures constant voltage sensitivity per F-stop light change throughout battery life. This sensitivity will still vary slightly with temperature changes, but the variation can be kept within acceptable limits, provided photocell thermal characteristics are specified accordingly.

As previously described, the preamplifiers consist of complementary silicon transistors Q1 and Q2 having their bases connected to the photocell circuit through resistors R8 and R10 respectively. The collector voltage applied to transistors Q1 and Q2 through resistors R7 and R9 respectively is unregulated and provides for collector voltage swings from the center tap value to full supply voltage levels in either case. Hence, the full supply voltage can be utilized by the invention to control the movement of the iris opening in the manner herein described.

The signal shaping networks 23 and 25 are basically large or transient signal shaping networks, and, in effect, differentiate the photocell signal prior to its entering the preamplifiers. They provide fast exposure correction without overshoot by returning the preamplifier input voltages essentially to balance levels immediately after the nearly sinusoidal photocell output voltage (formed by combined motor-iris rate of movement and photocell characteristics) has passed its peak. It can be shown that at this time the iris has reached its proper balance position for the new scene brightness level even through the light sensing element has not reached its steady state balance value due to its slow reaction capability.

Resistors R8 and R10, connected across capacitors C1 and C2 respectively, make the system capable of responding to small and slow light changes as well since they DC reference the preamplifier transistors. Any DC path across differentiating capacitors C1 and C2, such as provided by the resistors R8 and R10 for example, will diminish the effectiveness of the differentiating or signal shaping circuits. For this reason the resistors R8 and R10 must be as large as possible to hold their adverse effect upon the differentiating circuits to a minimum while still providing the necessary amount of DC reference to the preamplifiers. To further minimize such adverse effect, resistors R11 and R12 are returned to the collectors of Q1 and Q2 respectively in a negative feedback manner rather than to the more usual stable voltage levels in the circuit. With the aid of the latter connection, the adverse effect is eliminated to a satisfactory degree.

Small signal and inherent system stabilization is accomplished in the emitter circuits of the amplifier transistors Q3 and Q4 by means of a parallel combination of a resistor and a capacitor which make up the stabilizing networks 33 and 35. In a feedback or servosystem with a deadband and a definite amount of hysteresis, such as the instant invention, inherent system stability is assured when system action is stopped before the deadband region has been traversed by the feedback element, such as the iris in this case, because system reactivation in the opposite direction following a correction in one direction is prevented. Elimination of hysteresis theoretically allows infinite motor-iris rates without destroying inherent system stability. However, where hysteresis cannot be entirely eliminated, widening of deadband, increasing photocell response speed, and increasing turnoff level at a rapid rate once corrective action of the system has begun, all improve rapid action. That is, all of these techniques enable the utilization of faster iris rates than are possible without such corrective action and still provide an on-off servosystem that does not tend to oscillate continuously between the turn-on levels of the deadband. More specifically, fast action without oscillation or hunting between the turn-on levels is desired. And, this desirable result can be achieved by widening the deadband, increasing the photocell's reaction speed and/or increasing the turnoff level once corrective action has started (thus effectively eliminating hysteresis temporarily at the proper time). Since there is a limit to the width of the deadband (imposed by required exposure accuracy of the film, for example) and, since only a relatively small increase in photocell speed is realistically possible at this time (with high film speeds or sensitivities and the use of suitable DdS photoresistive cells behind the iris of an operational camera), rapid increase in turnoff level must be used to obtain the desired result. This rapid increase is accomplished in the invention through charging C3 or C4, as the case may be, to increase emitter bias of Q3 or Q4, and, thereby, cause the turnoff of Q3 or Q4 at a higher base input level than is necessary for turning these transistors on. Once turnoff is accomplished, C3 or C4, whichever one is charged, discharge through their associated parallel resistors R13 or R14. This discharge, preferably, occurs within two picture frames so that the transistors' sensitivity is immediately returned to their previous higher, before-actuation level.

As is well known in the art, when part of the in-phase output of a nonlinear amplifier is fed back to the amplifier's input, sustained oscillations occur, assuming a sufficient amount of such positive feedback is present. This effect occurs in the oscillating mode of the instant invention in the loop comprising Q1 and Q3 and the loop comprising Q2 and Q4. The feedback circuit is common to both loops and consists of C5 and R2. Sustained oscillations at a predetermined frequency are sustained in both loops. In one actual embodiment of the invention, the oscillation frequency was near 1,000 cycles per second and the oscillation waveform was triangular. The peak-to-peak amplitude of this voltage at the photocell string was considerably more than the minimum value necessary for full output voltage swing at the motor at the 1,000 cycles per second signal frequency rate, but still low enough so that the direct current and transient characteristics of the amplifiers were not seriously impaired. It will be appreciated that the values of C5, R21, photocell resistance, C1 and C2 all have an effect on oscillation amplitude and frequency, however, manipulation of C5 and R21 alone provides sufficient control so that proper inclusion of the oscillatory mode of system operation does not require the alteration of previously established circuit component values for the nonoscillatory mode of system operation. When the overall system is balanced, sustained symmetrical maximum amplitude positive and negative square waves are alternately imposed on the single winding DC motor M. Since the waves are symmetrical, the motor M receives average zero DC at balance. Hence, it does not move as long as the frequency of the imposed waveform is sufficiently high. However, there will be continuous maximum battery current drain even at system balance.

When slight light variation occurs in the scene being photographed or monitored, even within the limits of the direct current deadband region, oscillation frequency changes along with the direct current balance of the two loops. Because of direct current balance changes, unbalanced amplification of the oscillation waveform takes place, thus imposing a nonsymmetrical square wave upon the motor M. This nonsymmetrical square wave results in an effect of an average DC current being forced through the motor winding in one of the two possible directions which causes rotation of the motor shaft. When the shaft of the motor rotates, the iris opening changes in a slight and smooth manner for correction of small light variations.

While slight and slow light variations occur when the system is used in the nonoscillatory mode, no correction takes place for light variations within the deadband limits. At the same time, system current drain is radically reduced when compared to current drains encountered during iris correction. When fast, or slow but large, scene brightness changes take place in the nonoscillatory mode of operation, the differentiating circuit characteristics or DC sensitivity of the system and the differentiating circuit provide for correct system response, aided by the stabilization network effect.

When fast or large scene brightness changes take place in the oscillatory mode of operation, oscillations stop due to severe system unbalance and system response is similar to the nonoscillatory mode of operation.

The purpose of the oscillatory mode of system operation is to create a smooth and proportional correction near the limits of the DC deadband and to narrow the effective width of the deadband, thus providing for an acceptable system which requires less amplification (wide deadband) but which also consumes more operational power. The nonoscillatory mode of operation requires more amplification for a narrower deadband since relatively rough system correction at deadband limits—characteristic of this mode of operation—which are widely separated and near maximum allowable tolerance limits for the film utilized in the camera, for example, are likely to be unpleasantly noticed by the user. At the same time, the nonoscillatory mode of operation consumes less power at balance than the oscillatory mode.

The oscillatory mode of operation also imposes a maximum-voltage duty cycle across the motor many times during the exposure of each frame and thus eliminates the difficulty encountered in the lower-amplification approach to the problem whereby different motor commutator stoppage positions after each new exposure correction significantly alter the turn-on voltage levels for the motor from one correction to the next. In the nonoscillatory mode of operation, which inherently requires higher amplification levels, the higher system sensitivity itself eliminates the turn-on voltage differences mentioned as a problem. Some control over total system sensitivity is provided by the common collector resistor R22 to transistors Q3 and Q4 when a variable resistor is used in that location, and considerable transistor beta variations can be tolerated in transistors Q3 through Q8 as a result. Betas of transistors Q1 and Q2, however, must be kept within relatively narrow and properly chosen limits for the system to function properly.

The remaining pairs of complementary transistors Q5 and Q6, Q7 and Q8 are power amplifier transistors and apply the actual power to the motor M. These complementary amplifier transistors amplify the voltage signal from the oscillating or nonoscillating amplifiers to sufficient current levels to energize the motor to rotate the motor shaft in the desired direction.

The capacitor C6, connected in parallel with the motor, functions as an inductive voltage spike suppressor. The switch S2 is incorporated in the invention to serve as a low-light stop. That is, when the motor shaft (or iris) reaches a predetermined position, S2 opens and prevents further motor rotation in the switch opening direction which in turn prevents further iris opening from the stop position. System activation in the opposite direction remains possible since the connection between motor M and transistor Q6 remains intact. Once such opposite-direction-correction has taken place, switch S2 is once more closed and the system is fully operational in both directions.

In a manner similar to the one described above, a switch, similar to S2 and operated in a similar manner, can be included between the motor M and the collector of transistor Q6 to act as a high-light stop, if necessary. At present popular film speeds and in view of the iris range capability of a null-system exposure correction approach this is normally not necessary.

It will be appreciated from the foregoing description that the invention generally operates to provide a stabilized voltage across a light sensing device, resulting in a system that is unaffected by variations in power supply voltages operating the whole system during the usable life of the supply. The stabilized voltage is also utilized to stabilize performance of preamplifier transistors which are connected to the light detecting means. When the light detecting means detects light above or below a predetermined value, or predetermined values for different rates of light change, a pair of oscillating or nonoscillating amplifiers are unbalanced. This unbalance causes an unbalanced or unidirectional signal to be applied to a reversible DC motor so that the motor shaft rotates in one direction or another. The motor shaft controls the aperture of an iris which opens or closes as desired to bring the system back into balance and, in so doing, causes a proper illumination value to exist behind the iris regardless of the level of the scene brightness in front of the device. In the oscillatory mode of system operation a feedback means is provided to sustain such oscillations. The differentiating and stabilizing means in the preamplifier and the amplifier of the system assure rapid exposure correction without flicker or overshoot even though the light sensing means used would be incapable of similar fast reaction to a condition requiring correction, and thus constitute the most important feature of the invention. Finally, power amplifier means are included for the necessary power conversion to operate the motor-iris combination of the system.

It will be appreciated by those skilled in the art and others that the foregoing description has described two operational modes of a preferred embodiment of the invention. However, it will also be appreciated that various changes can be made within the scope of the description (such as the value of a resistor being reduced to zero, for example). For another example, the overall system could be formed of integrated circuits. In addition, various types of light detecting means could be utilized by the invention. Hence, the invention can be practiced otherwise than as specifically described herein.

The embodiments of the invention in which an exclusive property or privilege is claimed are defined as follows:

1. An automatic exposure control system for controlling the opening of an iris comprising:
 a power supply;
 a diode string connected across the output terminal of said power supply;

a first amplifier loop connected to said power supply to receive power from said power supply;

a second amplifier loop connected to said power supply to receive power from said power supply;

a feedback circuit connected between the inputs and the outputs of said first and second amplifier loops so as to be common to said first and second amplifier loops;

a photocell circuit connected to said diode string and to said first and second amplifier loops, said photocell circuit including a photocell mounted to sense light passing through said iris; and, a reversible DC motor electrically connected to said first and second amplifier loops and having its shaft mechanically connected to said iris to control the size of the aperture of said iris.

2. An automatic exposure control system for controlling the opening of an iris as claimed in claim 1 wherein:

said first amplifier loop includes a first preamplifier connected to said photocell circuit; and, said second amplifier loop includes a second preamplifier connected to said photocell circuit.

3. An automatic exposure control system for controlling the opening of an iris as claimed in claim 2 including:

a first voltage divider, connected across a portion of said diode string, connected to said first preamplifier; and, a second voltage divider, connected across a different portion of said diode string, connected to said second preamplifier.

4. An automatic exposure control system for controlling the opening of an iris as claimed in claim 3 including:

a first signal shaping network connected to said first preamplifier; and, a second signal shaping network connected to said second preamplifier.

5. An automatic exposure control system for controlling the opening of an iris as claimed in claim 4 wherein:

said first amplifier loop includes a first amplifier having its input connected to the output of said first preamplifier and its output connected to one side of said feedback circuit; and, said second amplifier loop includes a second amplifier having its input connected to the output of said second preamplifier and its output connected to said one side of said feedback circuit, the other side of the feedback circuit being connected to said first and second preamplifiers.

6. An automatic exposure control system for controlling the opening of an iris as claimed in claim 5 including:

a first power amplifier connected between the output of said first amplifier and one side of said DC motor; and, a second power amplifier connected between the output of said second amplifier and said one side of said DC motor, the other side of said DC motor being connected to the center tap of said power supply.

7. An automatic exposure control system for controlling the opening of an iris as claimed in claim 6 wherein said diode string is center tapped to said power supply.

8. An automatic exposure control system for controlling the opening of an iris as claimed in claim 7 including:

a first stabilizing circuit connected to said first amplifier; and, a second stabilizing circuit connected to said second amplifier.

9. An automatic exposure control system for controlling the opening of an iris as claimed in claim 8 including:

a switch mechanically connected to the shaft of said motor and electrically connected between said motor and the output of said second power amplifier, said switch being opened by said shaft when said iris is in a predetermined position.